Jan. 20, 1931.  O. DELITSCH  1,789,353

VALVE ACTUATING MECHANISM

Filed Aug. 24, 1927   3 Sheets-Sheet 1

WITNESS
E. Lutz

INVENTOR
O. Delitsch
BY
A. B. Reavis
ATTORNEY

Jan. 20, 1931.  O. DELITSCH  1,789,353
VALVE ACTUATING MECHANISM
Filed Aug. 24, 1927   3 Sheets-Sheet 3

WITNESS
E. Lutz.

INVENTOR
O. Delitsch
BY a. B. Rivers
ATTORNEY

Patented Jan. 20, 1931

1,789,353

UNITED STATES PATENT OFFICE

OTTO DELITSCH, OF BROOKLAWN, GLOUCESTER, NEW JERSEY, ASSIGNOR TO WESTINGHOUSE ELECTRIC & MANUFACTURING COMPANY, A CORPORATION OF PENNSYLVANIA

VALVE-ACTUATING MECHANISM

Application filed August 24, 1927. Serial No. 215,181.

My invention relates to a valve-actuating mechanism, and it has for an object to improve the operation thereof, and to make the same more reliable.

A specific object of my invention is to eliminate binding and bending of the valve stems in a multiple-valve steam chest which may be caused by inaccuracies of the parts.

Another object is to provide a housing for a spring such that practically all danger of accidentally releasing the spring in assembling or disassembling is avoided.

Another object is to provide a mechanism for opening and closing a plurality of valves in sequence, having the closing springs so arranged that a minimum of force is required of the governor or the relay to open the valves.

Another object is to provide a linkage mechanism for opening and closing a plurality of valves, having a main closing spring disposed to one side of the linkage where it may be more easily assembled, and where it does not use space necessary to accommodate the valve stems and linkage.

One embodiment of apparatus exemplifying my invention is illustrated in the accompanying drawing, in which.

Figures 1, 4, 5:
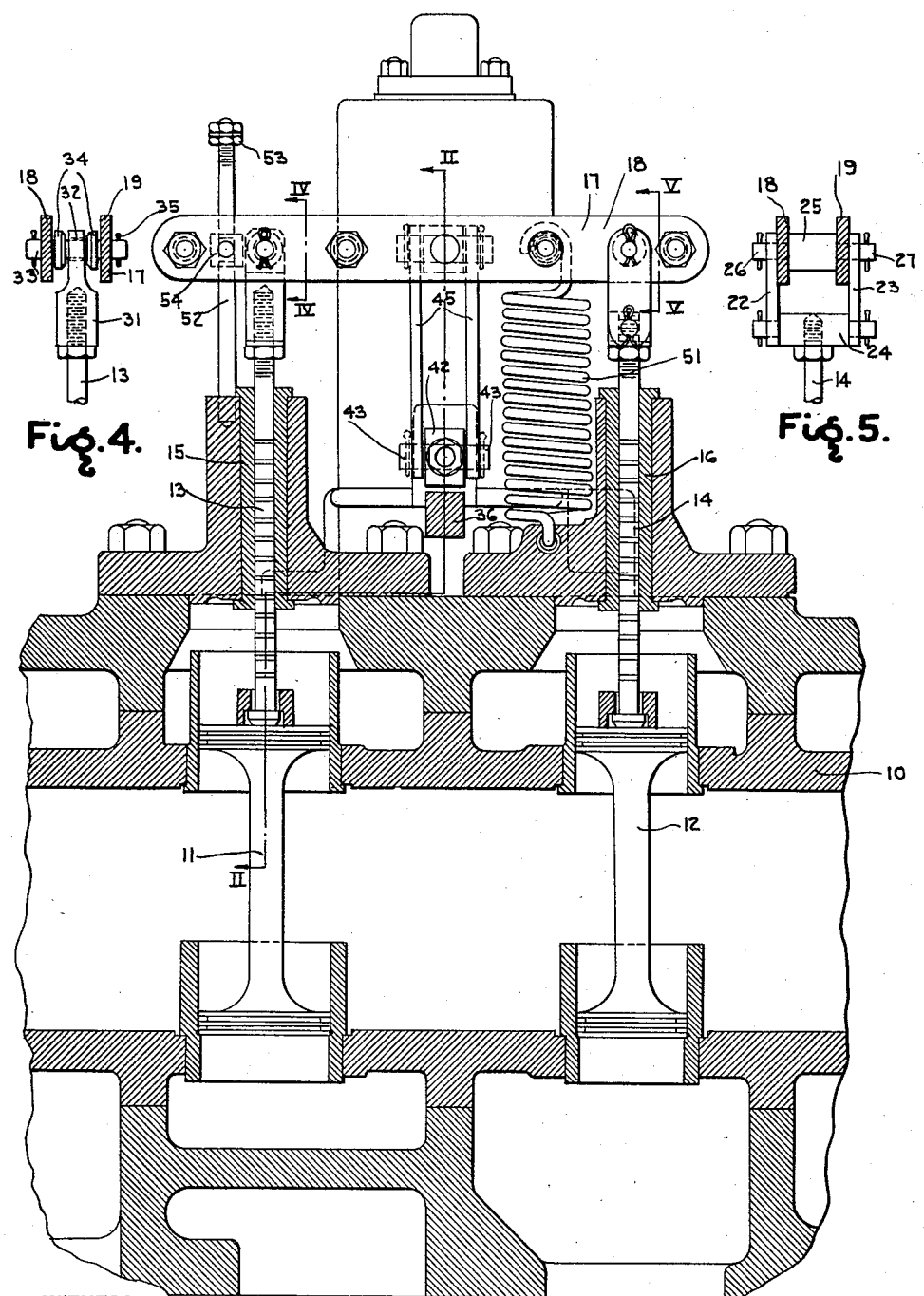
Fig. 1 is a vertical section of the apparatus, taken on the line I—I in Fig. 2 and in Fig. 3.
Figs. 4 and 5 are sectional views taken on the lines IV—IV and V—V, respectively, of Figs. 1 and 3.
Figure 2:
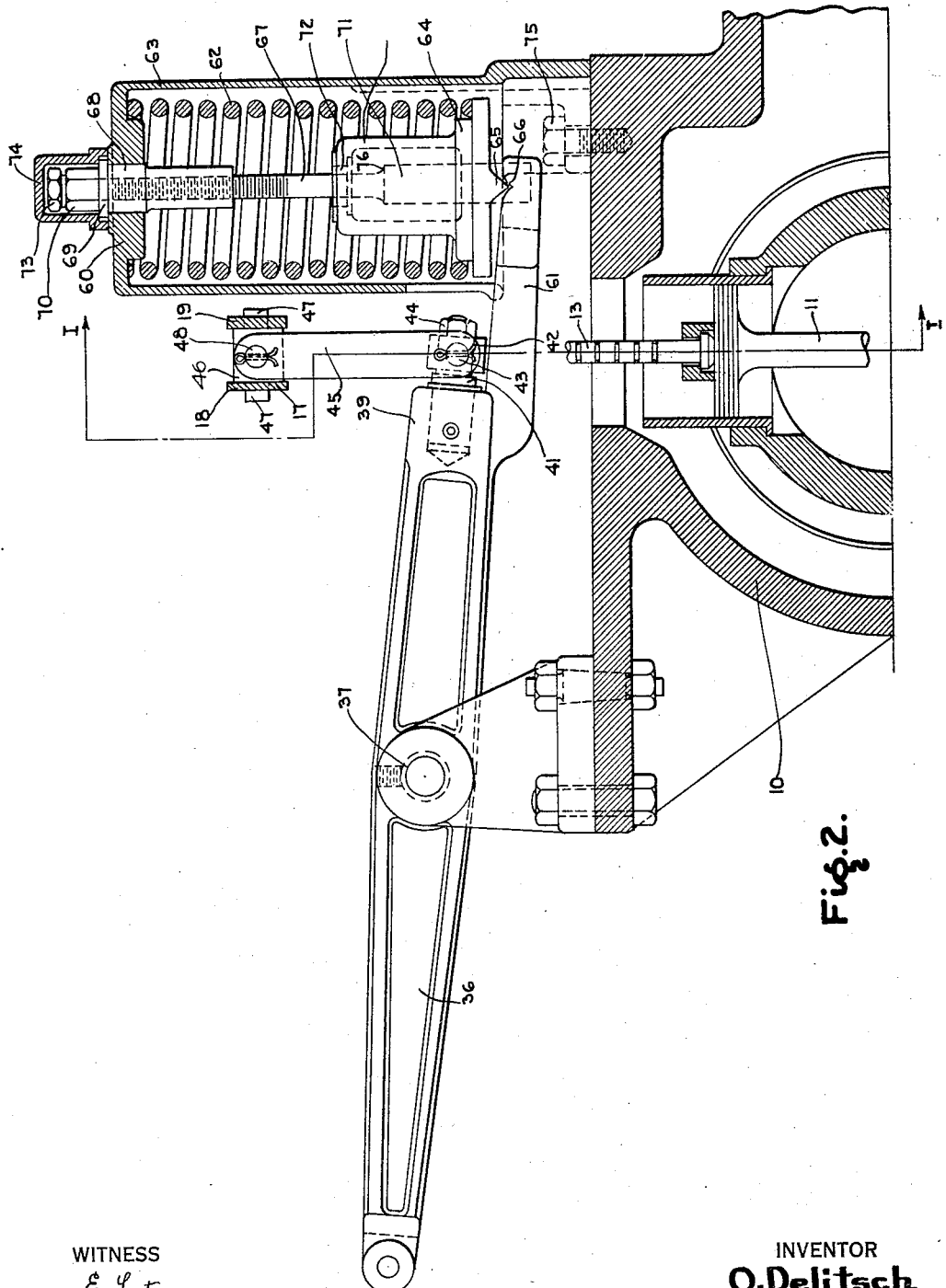
Fig. 2 is a vertical section taken at right angles to the section in Fig. 1, and corresponds to the line II—II in Fig. 1 and in Fig. 3.
Figure 3:
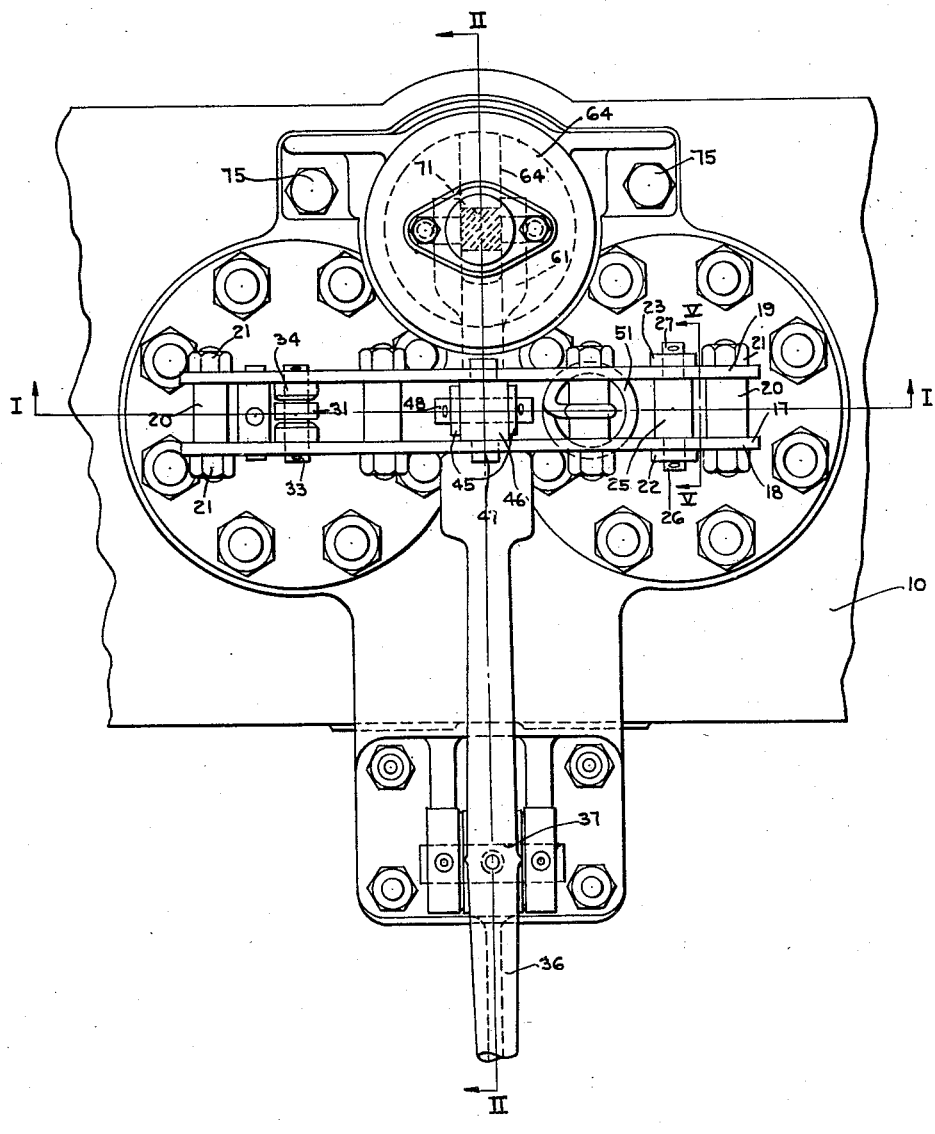
Fig. 3 is a plan view.

Referring now to the drawing in detail, I show a steam chest 10 having a primary valve 11 and a secondary valve 12 therein. Valve stems 13 and 14 are connected to and operate the valves 11 and 12, respectively. The valve stems are slidable in bushings 15 and 16 provided in the steam chest 10. The stems are pivotally connected to and operated by a lever 17. As shown in Figs. 2 and 3, the lever 17 is composed of parallel links 18 and 19 which are rigidly secured together by bolts 20 and nuts 21, the bolts 20 being formed with shoulders abutting the links to space them.

The valve stem 14 is pivotally secured to the lever 17 by means of links 22 and 23, which allow a swinging motion to the lever 17 in its longitudinal direction and are pin-fastened to the ends of a block 24, which in turn is screwed and locked to the end of the stem 14. The links are hinged at their upper ends on gudgeons 26 and 27 carried by a spacing member 25 and extending through the links 18 and 19 of the lever 17. It will thus be seen that the lever 17 cannot rotate about its longitudinal axis with respect to the stem 14. The lever 17 may move longitudinally with respect to the stem 14 because of the connection of the links 22 and 23.

The stem 13 has secured at its upper end a member 31, which may be screwed to the stem. The member 31 is provided with an opening 32 through which is inserted a pin 33, the latter also extending through openings in the links 18 and 19. The diameter of the opening 32 is slightly larger than the diameter of the pin 33, permitting a slight relative rocking of the member 31 and the pin 33, similar to the freedom of a ball and socket joint. Spacing blocks 34 are disposed on each side of the member 31 and maintain it in proper relation to the links 18 and 19. As will be noted from the drawing, the blocks 34 are beveled adjacent the member 31. The lever 17 and the stem 13 may therefore rotate a limited amount relatively to each other about the axis of the lever 17, this being permitted by the size of the opening 32 and the beveling of the spacing blocks 34. The pin 33 is preferably provided with cotter pins 35 at its ends to maintain it in place.

This construction eliminates binding of the parts and bending of the valve stems, which might otherwise be caused by inaccuracies in manufacture. For example, it is very difficult to cut the screw threads in the block 24 at exactly right angles thereto; consequently this block may be angularly misaligned relatively to the stem 14. Misalignment in a plane transverse of the lever 17 is transmitted to the lever but is allowed for by the pin 33 turning relatively to the member 31, and longitudinal misalignment is allowed for by the hinged connections of the links 22 and 23.

A lever 36 is pivoted at 37 to a stationary part of the steam chest, and forms the connection between the valve operating mechanism and the governor or relay (the latter not shown). The end 39 of the lever 36 is connected to the lever 17 for operating the same. A pin 41 is secured in the end of the lever and has rotatably mounted thereon a block 42. The block 42 has gudgeons 43 extending at right angles to the lever 36 and parallel with the lever 17. A lock nut 44 or any equivalent means is provided to retain the block 42 on the pin 41. Links 45 are pivoted on the gudgeons 43 and extend upwardly to the lever 17.

A block 46 is pivoted to the lever 17 by means of gudgeons 47 extending through openings in the links 18 and 19. The block 46 is also provided with a pin 48 whose ends extend through openings in the ends of the links 45. Any suitable means, such as cotter pins are provided at the ends of the pin 48 to retain the links 45 thereon.

It will thus be seen that the levers 36 and 17 are so connected that vertical movement of the lever 36 is transmitted to the lever 17 but that relative movement in any horizontal direction is provided for.

In order to provide the desired sequence of opening of the valves 11 and 12, a spring 51 is provided which is secured to the link 17 at a point nearer to the end at which the stem 16 is secured, the lower end of the spring being secured to a stationary part of the steam chest. At the opposite end of the lever 17, near the stem 13, is a rod 52 secured to the steam chest and having a nut 53 forming an adjustable abutment at the upper end thereof. The lever 17 is provided with a collar 54 having an opening through which the rod 52 extends, and which is adapted to contact with the nut 53 upon completion of the upward or opening movement of valve 11.

Upon upward movement of the end 39 of the lever 36 to open the valve, the spring 51 retains the secondary valve 12 closed and the lever 17 therefore opens the primary valve 11. Upon complete opening of the primary valve 11, the collar 54 strikes the nut 53 and limits further movement of this end of the lever 17, acting as a fulcrum therefor. Further upward movement imparted to the lever 17 must now be transmitted to the secondary valve 12 against the force of the spring 51. In order to bias the valves to closed position, and in order to save space and increase in governor force and the use of many heavy springs, I provide a spring which acts on the lever 36 and which is therefore effective on all the valves. The lever 36 is provided with a forked extension 61, and this extension is adapted to be acted upon by my novel form of spring assembly.

A compression spring 62 is disposed in a housing 63, the upper end 60 thereof being closed and forming an abutment or holding member for the upper end of the spring. The lower end of the spring is held by a holding member 64, which is also adapted to contact with the forked extension 61, being preferably provided with a knife edge 65 which seats in a groove 66 in the fork extension. The holding member 64 is shown as cup-shaped, this providing a convenient arrangement. It will be apparent, however, that it may be of any other form, for example, it may be in the form of a disc. An opening 72 is provided in the center of the holding member 64, through which extends a bolt 67. The bolt 67 is screw-threaded to a retaining member 68, the latter member having a collar 69, by means of which it is held against downward movement through an opening in the closed end 60. The lower end of the bolt 67 is provided with an abutment or enlarged portion 71, which is larger than the opening 72 in the holding member 64, and the upper end of which forms a shoulder 76 adapted to abut against the holding member 64.

The enlarged portion 71 of the bolt 67 is preferably, as shown in Fig. 3, square in cross section and fits between the forks of the extension 61, and also between the sides of a slot 64′ cut across the holding member 64 whereby the bolt 67 is held against rotation. The upper end of the member 68 is formed in the shape of a nut, as shown at 70, whereby it may be rotated or turned in order to screw it on to or off from the rod 67. A lock nut 73 is preferably provided to prevent rotation of the member 68 when it has been adjusted to its desired position. A cap 74 encloses the nut 73 and the upper end of the member 68 and the rod 67, and is secured to the housing 63.

The housing 63 is preferably secured to the steam chest by means of tap bolts 75. The screw threads of the tap bolts 75, and of the tapped holes in the steam chest into which they are inserted, are made longer than the distance between the shoulder 76 and the holding member 64 when the forked extension 61 is in the lowermost position. The purpose of this is to compress the spring 62 as the casing 63 is secured to the steam chest.

The retaining structure for the spring 62 is assembled as follows:

The spring 62, in an extended or uncompressed state, is inserted in the housing 63, one end of the spring projecting beyond the open end of the housing. The spring-holding member 64 is placed against the projecting end, and the bolt 67 is inserted through the opening 72. The member 68 is inserted through the opening in the closed end 60, and the screw-threaded bore thereof engaged with the screw-threaded end of the bolt 67. The member 68 is then rotated by means of the nut portion 70, drawing the bolt 67, the member 64 and the projecting end of the spring into the housing and compressing the spring 62. The nut 73 is then screwed on to the bolt 67 to secure the member 68 against rotation, and the cap 74 is mounted in place.

It will thus be seen that the spring is inserted in the housing and compressed therein without danger of accidental release and consequent injury to the person assembling the same, since it is held by the spring-holding member 64 through the bolt 67 and the member 68 as long as the spring is under compression. The correct initial compression of the spring 62 is also thereby assured, since the bolt 67 would strike the cap 74 if the spring were compressed too greatly, and would not engage the lock nut 73 if the spring were insufficiently compressed. To mount the spring assembly on the steam chest, it is placed over the fork extension 61, the knife edge 65 of the member 64 seating in the groove 66. As the spring holds the member 64 down against the shoulder 76, the assembly is held up from the top surface of the steam chest 10. The tap bolts 75 are inserted through the openings 76 and engaged in the screw threads of the tap hole 77 in the steam chest. The bolts are then screwed down, drawing the housing 63 down and further compressing the spring 62. As the housing 63 moves down, the shoulder 76 leaves the member 64, and the force of the spring 62 is then effective upon the forked extension 61.

Danger of injury due to accidental release is also eliminated in the second step, inasmuch as the bolt 75 holds the structure to the steam chest before any force is applied to the fork extension of the lever 36.

The operation of the above structure, which will be apparent from the description, is as follows:

The governor, or a relay operated thereby, operates the lever 36, which, in turn, actuates the lever 17 through the links 45 in a vertical direction.

The spring 51 holds the end of the lever 17 connected to the secondary valve, and consequently the lever 17 raises the primary valve 11 until the collar 54 strikes the abutment 53. Thereupon the abutment 53 acts as a fulcrum, and further upward movement imparted to the lever results in opening of the secondary valve 12 against the force of the spring 51. In closing, the reverse operation takes place.

By providing universal connections between the lever 36 and the links 45, and between the links 45 and the lever 17, no horizontal movements are transmitted, thereby avoiding all difficulties due to the parts moving in other than exactly a vertical direction.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art, or as are specifically set forth in the appended claims.

What I claim is:

1. In a valve-operating mechanism for a plurality of valves, the combination of a stem connected to each valve and longitudinally slidable in a stationary part, a longitudinal part connected to each stem and adapted to control the movements thereof, the connection between one steam and the longitudinal part preventing relative rotation about the longitudinal part, and the connection between the other stem or stems and said part permitting at least some relative rotation about the longitudinal part.

2. In an operating mechanism for a plurality of valves, the combination of a lever connected to each of said valves, a second lever for operating said valves through the first-mentioned lever and extending transversely of the first-mentioned lever, said second-mentioned lever being pivoted to a stationary fulcrum on one side of the first-mentioned lever, and a spring assembly disposed on the other side of the first-mentioned lever and biasing the second lever in the direction for closing said valves.

3. In a valve operating mechanism for a plurality of valves, the combination of a member connected to each valve and longitudinally slidable in a stationary part, a lever connected to the members and adapted to control the movements thereof, said lever comprising two parallel links fastened together in spaced relation, one of said members extending between said links of the lever and having an opening, a pin secured to the links and extending through said opening for pivotally connecting the member to the lever, the opening being slightly larger than the pin to permit some relative angular displacement about an axis longitudinal of the lever, and the other member straddling the lever and pivotally connected to the outer sides of the links thereof, the latter connection preventing relative angular displacement about an axis longitudinal of the lever.

In testimony whereof, I have hereunto subscribed my name this 22nd day of August, 1927.

OTTO DELITSCH.